United States Patent
Lam et al.

(10) Patent No.: US 11,600,293 B1
(45) Date of Patent: Mar. 7, 2023

(54) THREE TERMINAL MAGNETIC RECORDING HEAD

(71) Applicant: Western Digital Technologies, Inc., San Jose, CA (US)

(72) Inventors: Terence Lam, Cupertino, CA (US); Michael Kuok San Ho, Emerald Hills, CA (US); Yaguang Wei, Pleasanton, CA (US); Zhigang Bai, Fremont, CA (US); Muhammad Asif Bashir, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/559,372

(22) Filed: Sep. 3, 2019

Related U.S. Application Data (60) Provisional application No. 62/729,396, filed on Sep. 10, 2018, provisional application No. 62/790,838, filed on Jan. 10, 2019.

(51) Int. Cl.
| | | |
|---|---|---|
| *G11B 5/31* | (2006.01) | |
| *G11B 5/39* | (2006.01) | |
| *G11B 5/60* | (2006.01) | |
| *G11B 5/235* | (2006.01) | |
| *G11B 5/23* | (2006.01) | |
| *G11B 5/265* | (2006.01) | |
| *G11B 5/00* | (2006.01) | |

(52) U.S. Cl.
CPC ............. *G11B 5/3912* (2013.01); *G11B 5/23* (2013.01); *G11B 5/235* (2013.01); *G11B 5/2654* (2013.01); *G11B 5/2658* (2013.01); *G11B 5/315* (2013.01); *G11B 5/3133* (2013.01); *G11B 5/3146* (2013.01); *G11B 5/6082* (2013.01); *G11B 2005/0008* (2013.01); *G11B 2005/0018* (2013.01)

(58) Field of Classification Search
None
See application file for complete search history.

(56) References Cited

U.S. PATENT DOCUMENTS

| 8,472,135 B1 | 6/2013 | Kusukawa et al. |
| 8,693,142 B2 | 4/2014 | Chen et al. |
| (Continued) | | |

OTHER PUBLICATIONS

Michael, Mallary; "Head and Media Challenges for 3 Tb/in (2) Microwave-Assisted Magnetic Recording", IEEE Transactions on Magnetics; https://www.researchgate.net/publication/261177415, Feb. 2014 (10 pages).

*Primary Examiner* — Jefferson A Evans
(74) *Attorney, Agent, or Firm* — Patterson + Sheridan, LLP; Steven H. VerSteeg (57) ABSTRACT

A magnetic recording device includes a main pole, a coil around the main pole, a trailing shield, and a leading shield. A trailing gap is between the main pole and the trailing shield. In one embodiment, the trailing gap includes a non-magnetic conductive material. In another embodiment, the trailing gap includes a spin torque oscillator device. A leading gap is between the main pole and the leading shield. The leading gap includes a non-magnetic conductive material. The main pole is coupled to a first terminal. The trailing shield coupled to a second terminal. The leading shield is coupled to a third terminal.

32 Claims, 8 Drawing Sheets

(56) References Cited

U.S. PATENT DOCUMENTS

| | | | |
|---|---|---|---|
| 8,804,284 B1* | 8/2014 | Ohtake | G11B 5/1278 360/125.3 |
| 8,842,387 B1 | 9/2014 | Horide et al. | |
| 8,988,826 B2 | 3/2015 | Sugiyama et al. | |
| 9,007,723 B1 | 4/2015 | Igarashi et al. | |
| 9,230,571 B1* | 1/2016 | Chen | G11B 5/147 |
| 9,672,846 B1 | 6/2017 | Tanaka et al. | |
| 9,858,952 B1* | 1/2018 | Sato | G11B 5/3163 |
| 9,966,091 B2 | 5/2018 | Chen et al. | |
| 10,325,618 B1 | 6/2019 | Wu et al. | |
| 10,366,714 B1 | 7/2019 | Olson et al. | |
| 10,546,600 B1* | 1/2020 | Koizumi | G11B 5/6082 |
| 10,714,127 B1* | 7/2020 | Chen | G11B 5/312 |
| 10,714,132 B1* | 7/2020 | Chen | G11B 5/315 |
| 10,714,136 B1* | 7/2020 | Chen | G11B 5/3133 |
| 10,741,201 B2* | 8/2020 | Koizumi | G11B 5/02 |
| 10,748,562 B1* | 8/2020 | Chen | G11B 5/37 |
| 10,770,104 B1* | 9/2020 | Chen | G11B 5/187 |
| 10,997,988 B1* | 5/2021 | Le | G11B 5/3146 |
| 11,043,234 B2* | 6/2021 | Wu | G11B 5/314 |
| 2012/0113542 A1 | 5/2012 | Igarashi et al. | |
| 2014/0002924 A1* | 1/2014 | Yamada | G11B 5/3123 360/99.08 |
| 2015/0043106 A1* | 2/2015 | Yamada | G11B 5/1278 360/123.05 |
| 2016/0180867 A1* | 6/2016 | Takagishi | G11B 5/09 360/39 |
| 2017/0140779 A1* | 5/2017 | Koui | G11B 5/3146 |
| 2019/0066717 A1* | 2/2019 | Ohtake | G11B 5/3153 |
| 2019/0267029 A1* | 8/2019 | Bai | G11B 5/235 |
| 2020/0075046 A1* | 3/2020 | Koizumi | G11B 5/1278 |
| 2020/0176022 A1* | 6/2020 | Li | G11B 5/21 |
| 2020/0381012 A1* | 12/2020 | Chembrolu | G11B 5/115 |
| 2021/0056987 A1* | 2/2021 | Wu | G11B 5/3146 |
| 2021/0056988 A1* | 2/2021 | Chen | G11B 5/398 |
| 2021/0358517 A1* | 11/2021 | Isokawa | G11B 5/3912 |
| 2022/0084545 A1* | 3/2022 | Wu | G11B 5/012 |

* cited by examiner

THREE TERMINAL MAGNETIC RECORDING HEAD

CROSS-REFERENCE TO RELATED APPLICATIONS

This application is related to U.S. provisional patent application Ser. No. 62/729,396, filed Sep. 10, 2018, which is herein incorporated by reference, and related to U.S. provisional patent application Ser. No. 62/790,838, filed Jan. 10, 2019, which is herein incorporated by reference.

BACKGROUND

Field

Embodiments of the present disclosure generally relate to a three terminal magnetic recording head.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording head at an air bearing surface of the recording medium. As the main pole becomes smaller, the recording field becomes smaller as well, limiting the effectiveness of the magnetic recording head.

Heat-assisted magnetic recording (HAMR) and microwave assisted magnetic recording (MAMR) are two types of energy-assisted recording technology to improve the recording density of a magnetic recording medium, such as a HDD. In MAMR, an oscillation element or device is located next to or near the write element in order to produce a high-frequency magnetic field, such as in a microwave frequency band. The high-frequency magnetic field (in addition to a recording magnetic field emanated from a main pole of the write element) reduces an effective coercivity of a magnetic recording medium used to store data and allows writing of the magnetic recording medium at lower magnetic fields emanated from the write pole. Thus, higher recording density of the magnetic recording medium may be achieved by MAMR technology. Therefore, there is a need in the art for an magnetic recording head to achieve higher recording density of the magnetic recording medium.

SUMMARY

In one embodiment, a magnetic recording device includes a main pole, a coil around the main pole, a trailing shield, and a leading shield. A trailing gap is between the main pole and the trailing shield. The trailing gap includes a non-magnetic conductive material. A leading gap is between the main pole and the leading shield. The leading gap includes a non-magnetic conductive material. The main pole is coupled to a first terminal. The trailing shield coupled to a second terminal. The leading shield is coupled to a third terminal.

In another embodiment, a magnetic recording device includes a main pole, a coil around the main pole, a trailing shield, and a leading shield. A spin torque oscillator device is between the main pole and the trailing shield. A leading gap is between the main pole and the leading shield. The leading gap includes a non-magnetic conductive material. The main pole is coupled to a first terminal. The trailing shield coupled to a second terminal. The leading shield is coupled to a third terminal.

In yet another embodiment, a magnetic recording device includes a main pole providing a main writing magnetic field, a first assisting writing magnetic field means, and a second assisting writing magnetic field means. An electric connection means provides a first bias current provided to the first assisting writing magnetic field and a second bias current provided to the second assisting writing magnetic field means.

In one embodiment, a method of writing data to a magnetic medium includes providing a write current to a coil of a main pole. A first current path is provided through a trailing gap and a second current path provided through a leading gap. A first bias current is provided though the first current path and a second bias current is provided through the second current path.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The terms "over," "under," "between," "on", and other similar terms as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. The relative position of the terms does not define or limit the layers to a vector space orientation of the layers.

The term "comprises/comprising" includes the subset meaning of "consists/consisting essentially of" and includes the subset meaning of "consists/consisting of."

In certain embodiments, a magnetic recording device includes a first terminal coupled to a main pole, a second terminal coupled to a trailing shield, and a third terminal coupled to a leading shield to form a first current path through a trailing gap and a second current path through a leading gap. The three terminals allow independent control of bias current through the first current path and the second current path.

In one example, the first current path may be through a trailing gap comprising a non-magnetic conductive material to provide a first current assist magnetic field and the second current path may be through a leading gap comprising a non-magnetic conductive material to provide a second current assist magnetic field. The first current path may be further provided through the leading gap to produce another current assist magnetic field.

In another example, the first current path may be through a trailing gap comprising a spin torque oscillator (STO) device to provide a STO magnetic field and the second current path may be through a leading gap comprising a non-magnetic conductive material to provide a current assist magnetic field. The first current path may be further provided through the leading gap to produce another current assist magnetic field. The bias current to the second current path may be provided without causing Joule heating of the STO device and without causing a reduction in the reliability of the STO device.

Figure 1:
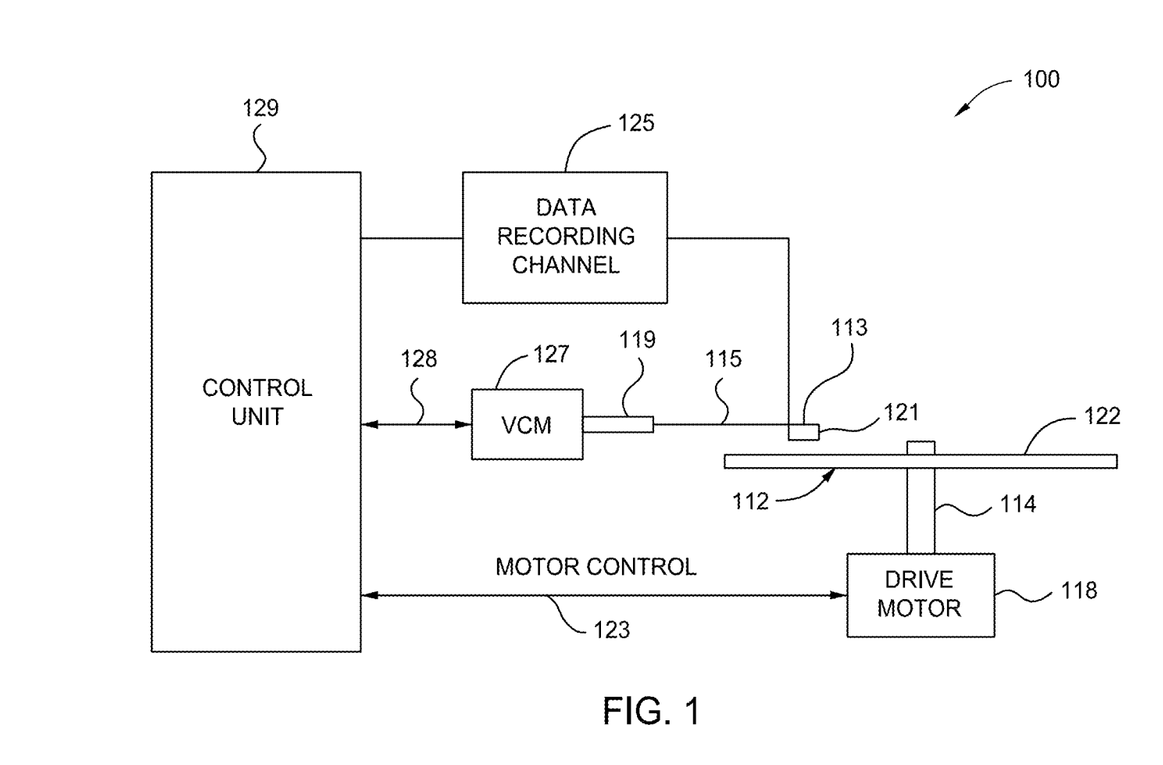
FIG. 1 is a schematic illustration of certain embodiments of a magnetic media drive including a magnetic recording head.

FIG. 1 is a schematic illustration of certain embodiments of a magnetic media drive including a magnetic recording head, such as a perpendicular magnetic recording (PMR) head or a MAMR head. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a PMR head or a MAMR head including a STO device. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
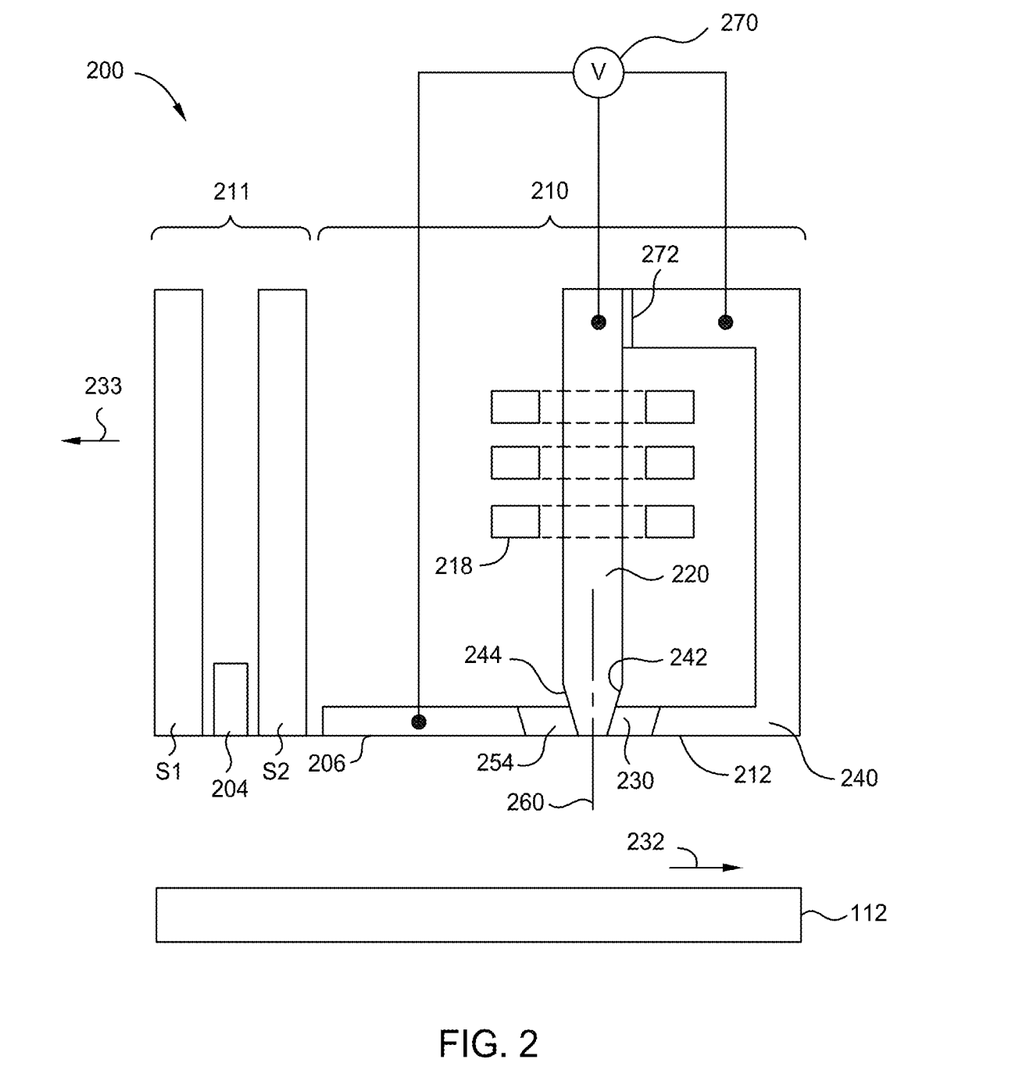
FIG. 2 is a schematic illustration of certain embodiments of a cross sectional side view of a head assembly facing a magnetic disk.

FIG. 2 is a schematic illustration of certain embodiments of a cross sectional side view of a head assembly 200 facing the magnetic disk 112. The head assembly 200 may correspond to the head assembly 121 described in FIG. 1. The head assembly 200 includes a media facing surface (MFS) 212, such as an air bearing surface (ABS), facing the disk 112. As shown in FIG. 2, the magnetic disk 112 relatively moves in the direction indicated by the arrow 232 and the head assembly 200 relatively moves in the direction indicated by the arrow 233.

In some embodiments, the head assembly 200 includes a magnetic read head 211. The magnetic read head 211 may include a sensing element 204 disposed between shields S1 and S2. In certain embodiments, the sensing element 204 is a magneto-resistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The head assembly 200 includes a write head 210. In certain embodiments, the write head 210 includes a main pole 220, a leading shield 206, a trailing shield 240, and a trailing gap 230 disposed between the main pole 220 and the trailing shield 240. The main pole 220 serves as a first electrode and has a front portion at the MFS.

The main pole 220 comprises CoFe alloy, such as CoFe, CoFeNi, or other suitable magnetic materials. In certain embodiments, the main pole 220 comprises small grains of magnetic materials in a random texture, such as body-centered cubic materials formed in a random texture. For example, a random texture of the main pole 220 may be formed by electrodeposition, such as electroplating. The write head 210 includes a coil 218 around the main pole 220 that excites the main pole 220 producing a writing magnetic field structures for affecting a magnetic medium of the rotatable magnetic disk 112. The coil 218 may be a helical structure or one or more sets of pancake structures.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

The trailing shield 240 is a magnetic film serving as a second electrode and return pole for the main pole 220. The leading shield 206 may provide electromagnetic shielding and is separated from the main pole 220 by a leading gap 254. The leading gap 254 comprises a non-magnetic conductive material to pass a bias current through the leading shield 206, the leading gap 254, and through main pole 220.

A power source 270 is coupled to the main pole 220, the trailing shield 240, and the leading shield 206 to independently provide current through the trailing gap 230 versus the leading gap 254. The main pole 220 is separated from the trailing shield 240 by an insulating layer 272.

In certain embodiments of the write head 210, the trailing gap 230 comprises a non-magnetic conductive material. The non-magnetic conductive material of the trailing gap 230 includes Au, Ag, Pt, Ta, Ir, Al, Si, Ge, Ti, Cu, Pd, Ru, Mo, W, other non-magnetic metals, alloys thereof, and multiple layers thereof. The bias current through the trailing gap 230 comprising a non-magnetic conductive material provides an current assist effect producing an assisting magnetic field (in addition to the recording magnetic field emanated from the main pole 220 of the write element) to reduce an effective coercivity of the magnetic recording medium of the rotatable magnetic disk 112. In certain embodiments, the leading gap 254 comprises a non-magnetic conductive material. The non-magnetic conductive material of the leading gap 254 includes Au, Ag, Pt, Ta, Ir, Al, Si, Ge, Ti, Cu, Pd, Ru, Mo, W, other non-magnetic metals, alloys thereof, and multiple layers thereof. The bias current through the leading gap 254 provides another current assist effect producing another assisting magnetic field to reduce an effective coercivity of the magnetic recording medium of the rotatable magnetic disk 112.

In certain embodiments of the write head 210, the gap 230 comprises a spin torque oscillator device. The bias current through the trailing gap 230 comprising a STO device provides an MAMR effect in which the STO device produces an assisting high-frequency magnetic field (in addition to the recording magnetic field emanated from the main pole 220 of the write element) to reduce an effective coercivity of the magnetic recording medium of the rotatable magnetic disk 112. In certain embodiments, the leading gap 254 comprises a non-magnetic conductive material. The non-magnetic conductive material of the leading gap 254 includes Au, Ag, Pt, Ta, Ir, Al, Si, Ge, Ti, Cu, Pd, Ru, Mo, W, other non-magnetic metals, alloys thereof, and multiple layers thereof. The bias current through the leading gap 254 provides a current assist effect producing another assisting magnetic field to reduce an effective coercivity of the magnetic recording medium of the rotatable magnetic disk 112.

Figure 3:
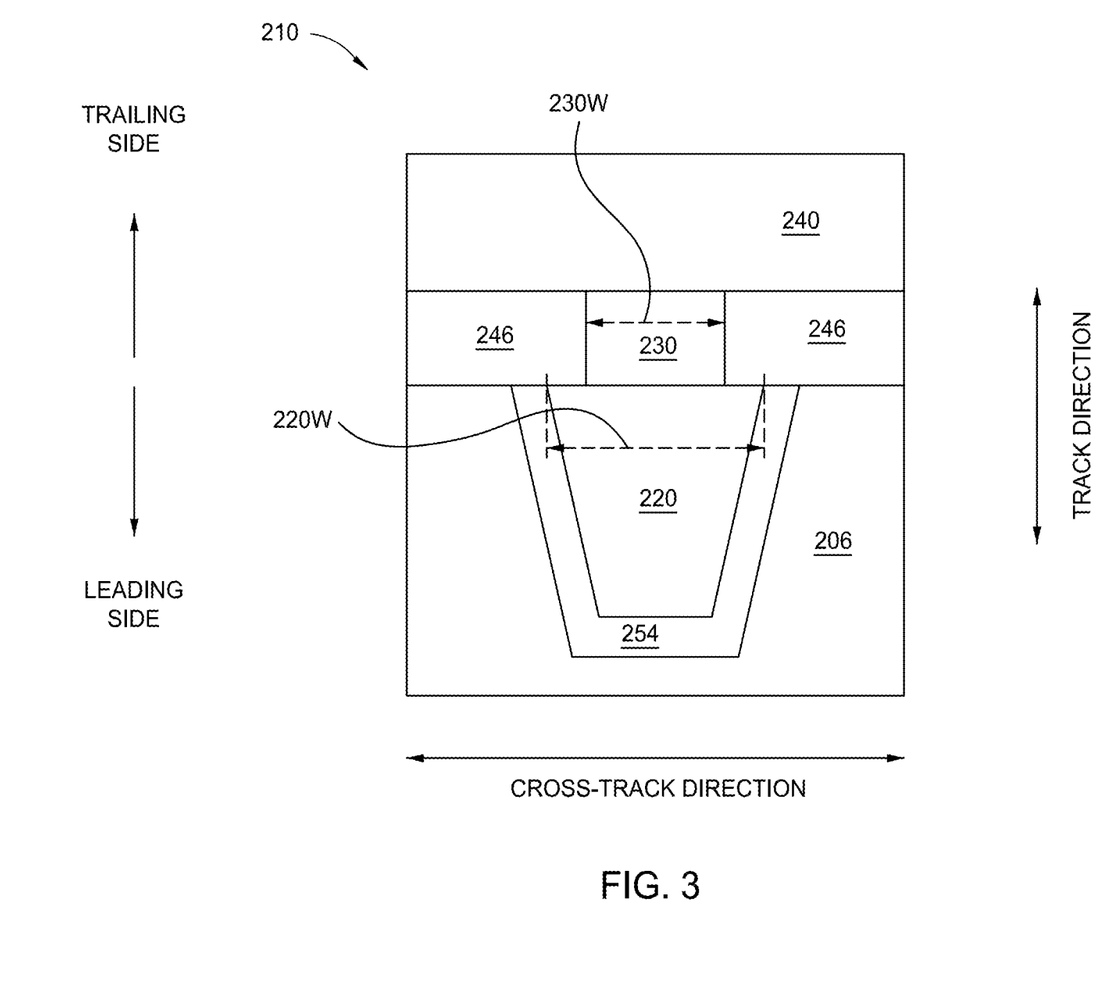
FIG. 3 is a schematic illustration of certain embodiments of a plan view of a media facing surface of a write head of FIG. 2 with a trailing gap between a main pole and a trailing shield in a track direction.

FIG. 3 is a schematic illustration of certain embodiments of a plan view of a media facing surface of a write head 210 of FIG. 2 with a trailing gap 230 between a main pole 220 and a trailing shield 240 in the track direction. The main pole 220 of the write head 210 may be any suitable shape (i.e., trapezoidal, triangular, etc.) and suitable dimensions. The trailing gap 230 may be formed to any suitable shape, any suitable dimension, and any suitable position between the main pole 220 and the trailing shield 240. For example, the width 230W of the trailing gap 230 may be greater than, equal to, or less than the width 220W of the main pole 220 at the interface with the trailing gap 230.

The leading shield 206 may be positioned on one or more sides of the main pole 220 with the leading gap 254 therebetween. A side gap 246 may be positioned on the sides of the trailing gap 230. The side gap 246 may comprise an insulating material.

Figure 4:
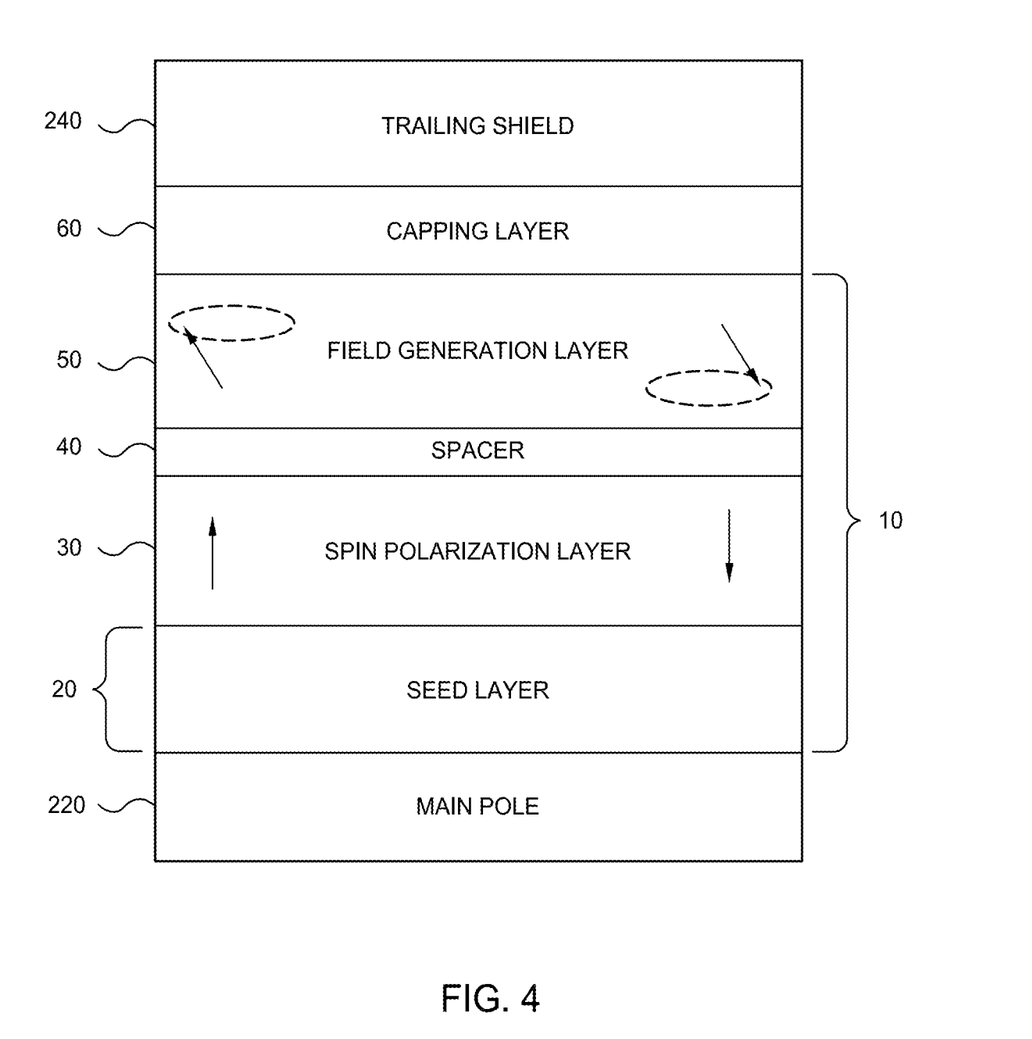
FIG. 4 is a schematic plan view of a media facing surface of certain embodiments of a trailing gap of a write head comprising a STO device.

FIG. 4 is a schematic plan view of a media facing surface of certain embodiments of a trailing gap 230 of the write head 210 comprising a STO device 10, such as the write head 210 of FIG. 2 and FIG. 3. The STO device 10 is positioned proximate the main pole 220 and reduces the coercive force of the magnetic medium, so that smaller recording fields can be used to record data. A bias current applied to the trailing gap 230 comprising a STO device 10 from the power source 270 of FIG. 2 produces an assisting magnetic field, such as a microwave field. The bias current may be direct current (DC) waveforms, pulsed DC waveforms, and/or pulsed current waveforms going to positive and negative voltages.

In certain embodiments, the STO device 10 includes a seed layer 20 over or on the main pole 220, a spin polarization layer (SPL) 30 over or on the seed layer 20, a spacer layer 40 over or on the SPL 30, and a field generation layer (FGL) 50 over or on the spacer layer 40.

In certain embodiments, the seed layer 20 comprises ruthenium, copper, tantalum, other non-magnetic materials, alloys thereof, and multiple layers thereof. In certain embodiments, the seed layer 20 resets or provides a texture break for the growth of the SPL 30 over the seed layer 20 for low structural defects of the SPL 30. Low structural defects of the SPL 30 results in low coercivity in magnetization reversal of the SPL 30, lower critical current for reversal of the SPL 30, and better yield in the formation of the SPL 30. If an SPL is directly formed on a main pole, such as CoFe alloy main pole having a random texture, the SPL would undesirably having an high amount of structural defects since the random texture of the main pole is a poor surface for formation of the SPL. For example, a seed layer comprising tantalum provides a nano-crystalline structure formed over the random texture of the main pole 220. The nano-crystalline structure provides a smooth surface for formation of structured layers or crystalline layers thereover with low structure/crystal defects. In certain embodiments, the seed layer 20 provides a surface for good growth of structured and/or crystalline layers such, such as face centered cubic (FCC) metal alloys, body center cubic (BCC) metal alloys, and ordered phase alloys. For example, a seed layer 20 comprising ruthenium has a hexagonal close packed structure. The hexagonal close packed (HCP) structure provides a good template surface for growth or interfacing with a FCC layer, a BCC layer, or a Heusler layer with low structural defects.

In certain embodiments, the SPL 30 comprises NiFe, CoFe, CoFeNi, CoMnGe, NiCo, NiFeCu, CoFeMnGe, CoMnSi, CoFeSi, other high magnetic anisotropy materials, other Heusler alloys, other suitable magnetic layers, and multiple layers thereof. The SPL 30 can comprise a material having magnetic anisotropy oriented in a direction longitudinal to the film plane of the SPL 30 or perpendicular to the film plane of the SPL 30. The SPL 30 transmits spin torque to the FGL 50 causing oscillation of the magnetization of the FGL 50 at high velocity in a plane to thereby generate a high-frequency magnetic field, such as a microwave field. The magnetization of the SPL 30 is reversed to switch the oscillation direction of the magnetization of the FGL 50 to establish a consistent microwave field when the recording field is changed from the switch in polarization of the write pole 220 for low write errors.

The STO device 10 comprises a spacer layer 40 between the SPL 30 and the FGL 50. The spacer layer 40 includes one or more non-magnetic conductive materials, such as Au, Ag, Pt, Ta, Ir, Al, Si, Ge, Ti, Cu, Pd, Ru, Mo, W, AgSn, alloys thereof, and multiple layers thereof. The spacer layer 40 may reduce exchange coupling between the SPL 30 and the FGL 50. The spacer layer 40 may be made of a material having a high spin transmissivity for spin torque transfer from the SPL 30 to the FGL 50.

FGL 50 may include FeCo, NiFe, CoPt, CoCr, CoIr, CoFeAli, CoFeGe, CoMnGe, CoFeAl, CoFeSi, CoMnSi, TbFeCo, other magnetic materials, and multiple layers thereof. Spin torque transmitted from the SPL 30 to the FGL 50 causes oscillation of the magnetization of the FGL 50 generating a microwave field (a high-frequency magnetic field). The recording magnetic field applied from the main pole 220 to the STO device 10 maintains the magnetization direction of the SPL 30 and the FGL 50 so that the FGL 50 can oscillate to produce a microwave field. When an electron current flows through the STO device 10 from the seed layer 20 to the spin polarization layer 30, such as from the main pole 220 to the trailing shield 240, the electrons passing through the SPL 30 are polarized. The stream of polarized electrons from the SPL 30 to the FGL 50 imparts a spin torque to the field generation layer 50 causing the FGL 50 to emit a high-frequency magnetic field to the magnetic recording medium reducing the coercive force of the recording medium and reducing the switch field threshold.

In certain embodiments, a capping layer 60 may be on or over the STO device 10 and between the FGL 50 and the trailing shield 240. The capping layer 60 may comprise one or more magnetic layers, one or more non-magnetic conductive layers, or combinations thereof. Examples of a non-magnetic conductive layer of the capping layer 60 comprises NiCr, Cr, Pt, Ir, Ta, Ru, other non-magnetic conductive materials, and alloys thereof. Examples of a magnetic layer of the capping layer 60 comprises may include Fe, Co, Ni, other magnetic materials, and alloys thereof. In certain embodiments, the capping layer 60 protects the STO device 10 during formation of the STO device and formation of the magnetic write head 210, such as during deposition, patterning, cleaning, etc.

An electron current is applied to STO device 10 from a power source 270 to produce a microwave field. The STO device 10 may be electrically coupled to the main pole 220 and the trailing shield 240 in which the main pole 220 and the trailing shield are separated by an insulating layer 272. The power source 270 may provide electron current to the STO device 10 through the main pole 220 and the trailing shield 240. For direct current, the power source 270 may flow electron current from the main pole 220 through the STO device 10 to the trailing shield 240 or may flow electron current from the trailing shield 240 through the STO device 10 to the main pole 220 depending on the orientation of a spin polarization and a field generation layer of the STO device. In other embodiments, the STO device 10 may be coupled to electrical leads providing an electron current other than from the main pole and/or the trailing shield.

Figure 5A:
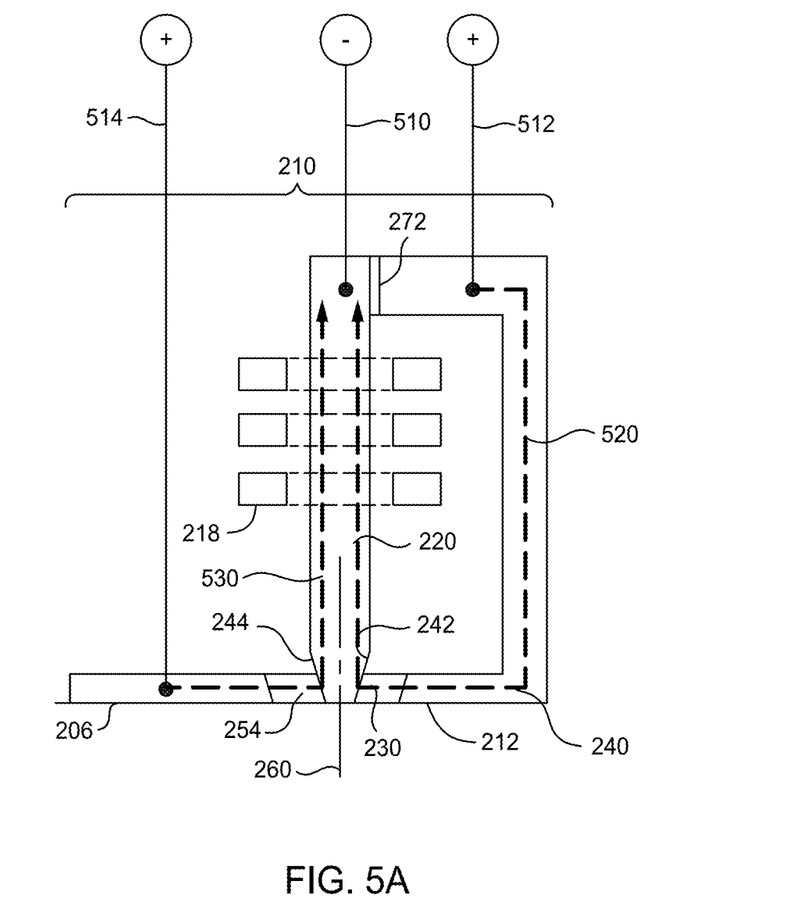
FIG. 5A is a schematic illustration of certain embodiments of a cross sectional side view of a write head with three terminals with different current paths through the trailing gap and the leading gap with the terminal connected to the main pole as a common terminal.

FIG. 5A is a schematic illustration of certain embodiments of a cross sectional side view of a write head 210 with three terminals with different current paths through the trailing gap and the leading gap with the terminal connected to the main pole as a common terminal. The head assembly 210 may correspond to the write head 210 described in FIGS. 2-4. The write head 210 comprises a first terminal 510 coupled to the main pole 220, a second terminal 512 coupled to the trailing shield 240, and a third terminal 514 coupled to the leading shield 206.

The first terminal 510 coupled to the main pole 220 and the second terminal 512 coupled to the trailing shield 240 form a first current path 520 through the trailing shield 240, trailing gap 230, and through the main pole 220 (in which the electron flow is in the opposite direction of the current flow). A bias current applied by the power source 270 to the first current path 520 creates an assisting magnetic field.

The first terminal 510 is coupled to the main pole 220 and the third terminal 514 is coupled to the leading shield 206 to form a second current path 530 through the leading shield 206, the leading gap 254, and the main pole 220. Another assisting magnetic field is produced from the second current path 530 through the leading shield 206, leading gap 254 and the main pole 220.

The first terminal 510 servers a common terminal of the first current path 520 and the second current path 530. The first terminal 510 has an opposite polarity than the second terminal 512 and the third terminal 514. As shown in FIG. 5A, the first terminal 510 is a negative terminal, the second terminal 512 is a positive terminal, and the third terminal

514 is a positive terminal. In other embodiments, the polarities of the terminals can be flipped in which the first terminal is a positive terminal, the second terminal is a negative terminal, and the third terminal is a negative terminal—reversing the direction of the current path.

When the trailing gap 230 comprises a non-magnetic conductive material, an assisting magnetic field (herein termed a "current assist magnetic field") is produced by the current flow through the trailing gap 230. A current assist magnetic field generated by a current bias through the first current path 520 of the trailing shield 240, through the trailing gap 230 comprising a non-magnetic conductive material, and through the main pole 220 helps to reduce the sector error rate of recording data to a magnetic media. The sector error rate improves with increasing current.

When the trailing gap 230 comprises a STO device 10, an assisting magnetic field (herein termed a "STO magnetic field") is produced from the oscillation of electrons of the field generation layer 50 of the STO device 10 by the current flow through the trailing gap 230. The electrons of the field generation layer 50 of the STO device 10 are oscillated by the current flow between the trailing shield 240 and the main pole 220 through the trailing gap 230. A STO magnetic field produced by a bias current through the first current path 520 of the trailing shield 240, the trailing gap 230 comprising a STO device, and through the main pole 220 helps to reduce the sector error rate of recording data to a magnetic media. The STO magnetic field plateaus at a certain bias current due to saturation of the FGL 50. A bias current to the first current path 520 through the trailing gap 230 comprising a STO device also produces a current assist effect in which the current assist effect increases with increasing current. However, it may be undesirable to maximize the current assist effect by increasing the bias current beyond the saturation level of the STO device since an increased bias current will cause increased Joule heating of the STO device and a reduction in the reliability of the STO device.

When the leading gap 254 comprises a non-magnetic conductive material, an assisting magnetic field (herein termed a "current assist magnetic field") is produced by the current flow through the leading gap 254. As shown in FIG. 5A, the write head 210 provides a current assist magnetic field or a STO magnetic field from the first current path 520 and a current assist magnetic field from the second current path 530. The assisting magnetic field (current assist or STO) generated by a bias current through the first current path 520 is independently controlled by the current through the first terminal 510 of the main pole 220 and the second terminal 512 of the trailing shield 240. The assisting magnetic field (current assist) generated by a bias current through the second current path 530 is independently controlled by the current through the first terminal 510 of the main pole 220 and the third terminal 514 of the leading shield 240. For example, a first bias current through the first current path 520 may be set to any desired level to provide a first current assist magnetic field, and a second bias current through the second current path 530 may be set to any desired level to provide a second current assist magnetic field.

The first terminal 510, the second terminal 512, and the third terminal 514 allow separate control of the bias current to the first current path 520 and the second current path 530. Different levels of bias current and/or different waveforms of the bias current may be supplied through the first current path 520 and the second current path 530 to allow adjustment of the current assist magnetic field or STO magnetic field from the first current path 520 and of the current assist magnetic field from the second current path 530. The different levels of bias current may be provided by a single power source 270 with a fixed resistor, variable resistor, and the like or may be provided by multiple power sources 270.

When the trailing gap 230 comprises a STO device, increasing the bias current beyond a certain bias current level through the trailing gap 230 does not increase the STO effect due to saturation of the oscillation levels of the STO device. Increasing the bias current through the trailing gap 230 does increase the current assist effect, but undesirably causes joule heating of the STO device reducing the STO device's reliability and lifetime. In certain embodiments, a bias current through the second current path 530 can be increased or maximized to provide a current assist effect from the second current path 530 without causing joule heating of the trailing gap 230 comprising a STO device. The STO magnetic field generated by a bias current through the first current path 520 through the trailing gap 230 comprising a STO device may be independently provided in combination with the current assist magnetic field generated by a bias current through the second current path 530. For example, the bias current through the second current path 530 may be set to any desired level to provide a current assist magnetic field without causing Joule heating of the trailing gap 230 comprising a STO device.

Figure 5B:
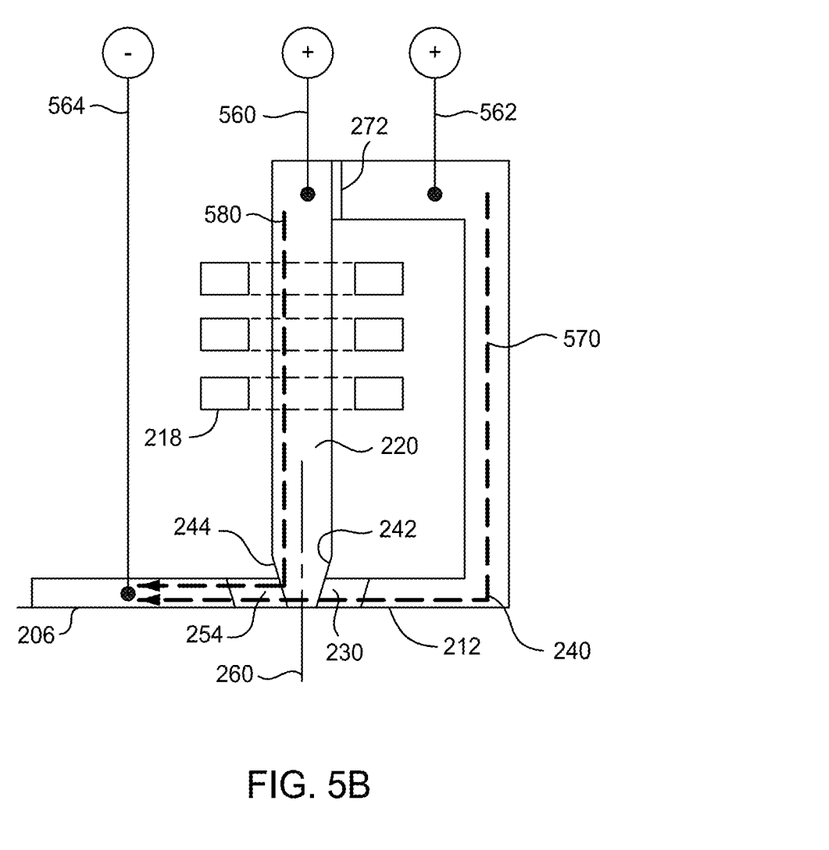
FIG. 5B is a schematic illustration of certain embodiments of a cross sectional side view of a write head with three terminals with different current paths through the trailing gap and the leading gap with the terminal connected to the trailing shield as a common terminal.

FIG. 5B is a schematic illustration of certain embodiments of a cross sectional side view of a write head 210 with three terminals with different current paths through the trailing gap and the leading gap with the terminal connected to the trailing shield as a common terminal. The head assembly 210 may correspond to the write head 210 described in FIGS. 2-4. The write head 210 comprises a first terminal 560 coupled to the main pole 220, a second terminal 562 coupled to the trailing shield 240, and a third terminal 564 coupled to the leading shield 206.

The second terminal 562 coupled to the trailing shield 240 and the third terminal 564 coupled to the leading shield 206 form a first current path 570 through the trailing shield 240, through the trailing gap 230, through the tip of the main pole 220, through the leading gap 254, and through the leading shield 206 (in which the electron flow is in the opposite direction of the current flow). A bias current applied by the power source 270 to the first current path 520 creates assisting magnetic fields.

The first terminal 560 coupled to the main pole 220 and the third terminal 564 coupled to the trailing shield 240 form a second current path 580 through the main pole 220, through the leading gap 254, and through the leading shield 206 (in which the electron flow is in the opposite direction of the current flow). Another assisting magnetic field is produced from the second current path 580.

The third terminal 564 servers a common terminal of the first current path 570 and the second current path 580. The third terminal 564 has an opposite polarity than the first terminal 560 and the second terminal 562. As shown in FIG. 5B, the third terminal 564 is a negative terminal, the first terminal 560 is a positive terminal, and the second terminal 562 is a positive terminal. In other embodiments, the polarities of the terminals can be flipped in which the third terminal is a positive terminal, the first terminal is a negative terminal, and the second terminal is a negative terminal—reversing the direction of the current path.

When the trailing gap 230 comprises a non-magnetic conductive material, a current assist magnetic field is produced by the current flow through the trailing gap 230. A current assist magnetic field generated by a current bias to the first current path 570 through the trailing gap 230 comprising a non-magnetic conductive material helps to reduce the sector error rate of recording data to a magnetic media. The sector error rate improves with increasing current.

When the trailing gap 230 comprises a STO device 10, a STO magnetic field is produced from the oscillation of electrons of the field generation layer 50 of the STO device 10. The electrons of the field generation layer 50 of the STO device 10 are oscillated by the current flow through the trailing gap 230. A STO magnetic field produced by a bias current to the first current path 520 through the trailing gap 230 helps to reduce the sector error rate of recording data to a magnetic media. The STO magnetic field plateaus at a certain bias current due to saturation of the FGL 50. A bias current to the first current path 570 through the trailing gap 230 comprising a STO device also produces a current assist effect in which the current assist effect increases with increasing current. However, it may be undesirable to maximize the current assist effect by increasing the bias current beyond the saturation level of the STO device since an increased bias current will cause increased Joule heating of the STO device and a reduction in the reliability of the STO device.

The first current path 570 further continues through the tip of the main pole 220, through the leading gap 254, and through the leading shield 206. A bias current through the first current path 570 produces an additional current assist magnetic field through the leading gap 254 comprising a non-magnetic conductive material.

When the leading gap 254 comprises a non-magnetic conductive material, a current assist magnetic field is produced by the current flow through the leading gap 254. As shown in FIG. 5B, when the trailing gap 230 comprises a non-magnetic conductive material, the write head 210 provides a first current assist field from the first current path 570 through the trailing gap 230, a second current assist magnetic field from the first current path 570 through the leading gap 254, and a third current assist magnetic field from the second current path 580 through the leading gap 254.

When the trailing gap 230 comprises a STO device, the write head 210 provides a STO magnetic field from the first current path 570 through the trailing gap 230, a first current assist magnetic field from the first current path 570 through leading gap 254, and a second current assist magnetic field from the second current path 580 through the leading gap 254. Both the first current path 570 and the second current path 580 produce a current assist magnetic field (i.e., a first current assist magnetic field and a second current assist magnetic field) through the leading gap 254 comprising a non-magnetic conductive material.

The bias current through the first current path 570 is independently controlled by the current through second terminal 562 of the trailing shield 240 and the third terminal 564 of the leading shield 206.

The bias current through the second current path 580 is independently controlled by the current through the first terminal 560 of the main pole 220 and the third terminal 514 of the leading shield 206.

In one embodiment, the write head 210 includes a trailing gap 230 comprising a non-magnetic conductive material and a leading gap 254 comprising a non-magnetic conductive material to provide a current assist magnetic field from both the trailing gap 230 and the leading gap 254. In one embodiment, the current assist magnetic fields generated by a bias current of the first current path 570 through the trailing gap 230 and through the leading gap 254 may be independently provided in combination with the current assist magnetic field generated by a bias current of the second current path 530 through the leading gap 254. For example, a first bias current through the first current path 570 may be set to any desired level to provide a first current assist magnetic field through the trailing gap 230 and to provide a second current assist magnetic field through the leading gap 254, and a second bias current through the second current path 580 may be set to any desired level to provide a third current assist magnetic field.

In another embodiment, the write head 210 includes a trailing gap 230 comprising a STO device and a leading gap 254 comprises a non-magnetic conductive material to provide an STO-assist magnetic field from the first current path 570 through the trailing gap 230 and a first current assign magnetic field from the first current path 570 through the leading gap 254 and a second current assist magnetic field from the second current path 530 through the leading gap 254. In one embodiment, the STO-assist magnetic field generated by a bias current of the first current path 570 through the trailing gap 230 and the first current assist magnetic field generated by the bias current of the first current path 570 through the leading gap 254 may be independently provided in combination with the second current assist magnetic field generated by a bias current of the second current path 580 through the leading gap 254. For example, a first bias current through the first current path 570 may be set to any desired level to provide a STO-assist magnetic field through the trailing gap 230 and to provide a first current assist magnetic field through the leading gap 254, and a second bias current through the second current path 580 may be set to any desired level to provide a second current assist magnetic field.

Both the first current path 570 and the second current path 580 produce a current assist magnetic field (i.e., a first current assist magnetic field and a second current assist magnetic field) through the leading gap 254 comprising a non-magnetic conductive material. Since bias current through the leading gap 254 is provided by the first current path 570 and the second current path 580 while bias current through the trailing gap 230 is provided by the first current path 570, the leading gap 254 has a greater total current flow than the trailing gap 230. In embodiments wherein the trailing gap 230 is a STO device, joule heating of the STO device is reduced by routing additional current through the second current path 580 to the leading gap 254.

When the trailing gap 230 comprises a STO device, increasing the bias current beyond a certain bias current level through the trailing gap 230 does not increase the STO effect due to saturation of the oscillation levels of the STO device. Increasing the bias current through the trailing gap 230 does increase the current assist effect, but undesirably causes joule heating of the STO device reducing the STO device's reliability and lifetime. In certain embodiments, a bias current through the second current path 580 can provide a current assist effect from the second current path 580 without causing joule heating of the trailing gap 230 comprising a STO device.

The first terminal 560, the second terminal 562, and the third terminal 564 allow separate control of the bias current to the first current path 570 and the second current path 580. Different levels of bias current and/or different waveforms of the bias current may be supplied through the first current path 570 and the second current path 580 to allow adjustment of the current assist magnetic field or STO magnetic field from the first current path 570 through the trailing gap 230 along with the additional current assist magnetic field through the leading gap 254 and of the current assist magnetic field from the second current path 580 through the leading gap 254. The different levels of bias current may be provided by a single power source 270 with a fixed resistor, variable resistor, and the like or may be provided by multiple power sources 270.

Figure 6:
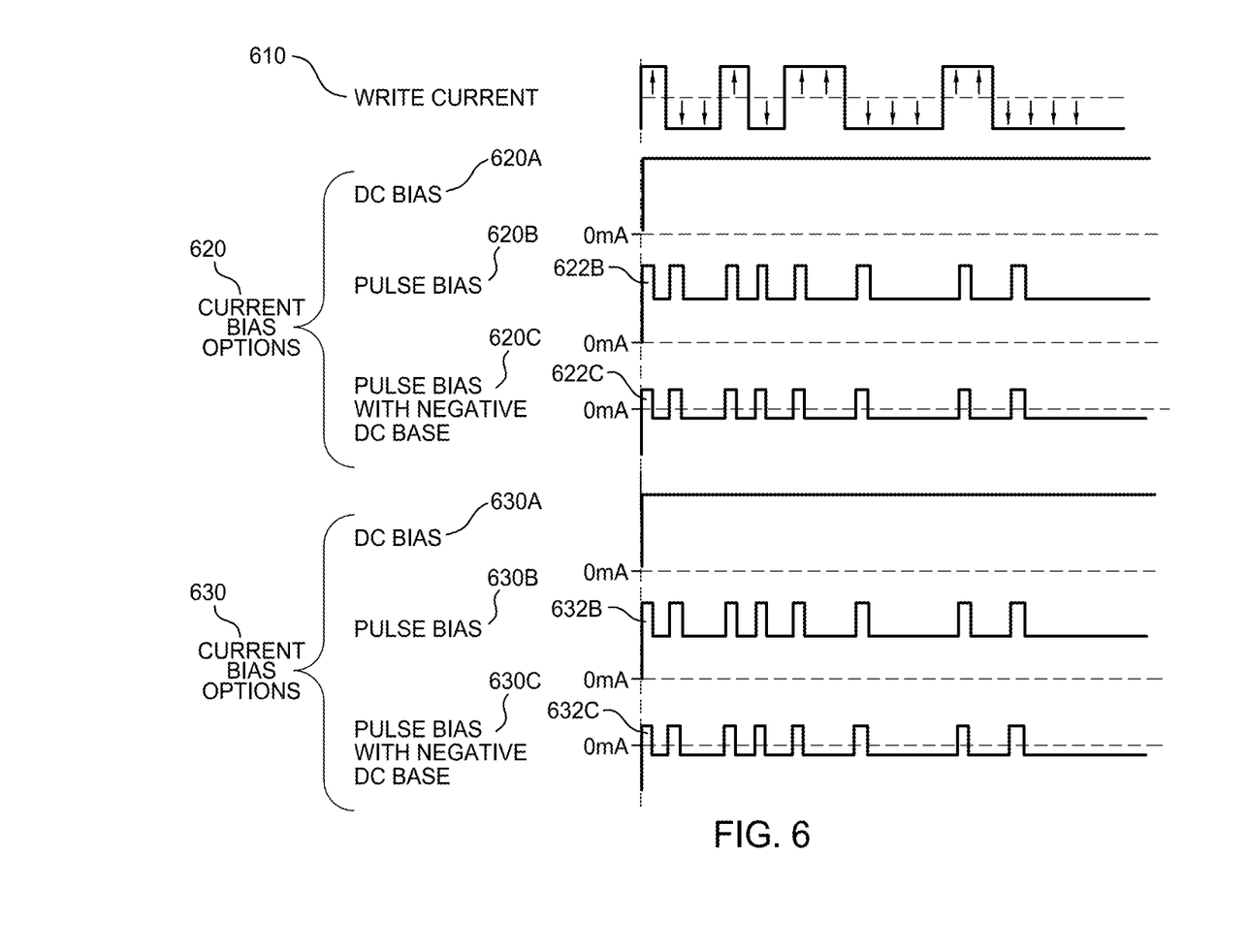
FIG. 6 is a schematic illustration of certain embodiments of waveforms of electric currents supplied to a write coil of a main pole, to a first current path through a trailing gap comprising a non-magnetic conductive material, and to a second current path of a write head described in reference to FIGS. 5A-B.

FIG. 6 is a schematic illustration of certain embodiments of waveforms of electric currents supplied to the write coil 218 of the main pole 220, to the first current path 520, 570 through a trailing gap 230 comprising a non-magnetic conductive material, and to the second current path 530 of the write head 210 described in reference to FIGS. 5A-B.

The waveform 610 provided to the write coil 218 energizes the main pole 220 to produce a recording magnetic field to align or switch a media bit, such as a perpendicular recorded bit or a longitudinal recorded bit, of the magnetic recording medium in alignment with the recording magnetic field.

In certain embodiments, a waveform 620 is provided to the first current path 520, 570 in which the trailing gap 230 comprises a non-magnetic conductive material to provide a first current assist magnetic field. The waveform 620 may be a constant DC bias waveform 620A which remain on regardless of the change in polarity of the write current waveform 610. The waveform 620 may be a pulse assist waveform 620B. The pulse assist waveform 620B includes pulses 622B to roughly correspond whenever the write current 610 changes polarity. The waveform 620 may be a pulse assist with negative DC base waveform 620C with pulses 622C to roughly precede the change in polarity of the write current 610 and a base level of negative DC bias.

In certain embodiments, a waveform 630 is provided to the second current path 530, 580 to provide another current assist magnetic field. The waveform 630 may be a constant DC bias waveform 630A which remain on regardless of the change in polarity of the write current waveform 610. The waveform 630 may be a pulse assist waveform 630B. The pulse assist waveform 630B includes pulses 632B to roughly correspond whenever the write current 610 changes polarity. The waveform 630 may be a pulse assist with negative DC base waveform 630C with pulses 632C to roughly precede the change in polarity of the write current 610 and a base level of negative DC bias.

Figure 7:
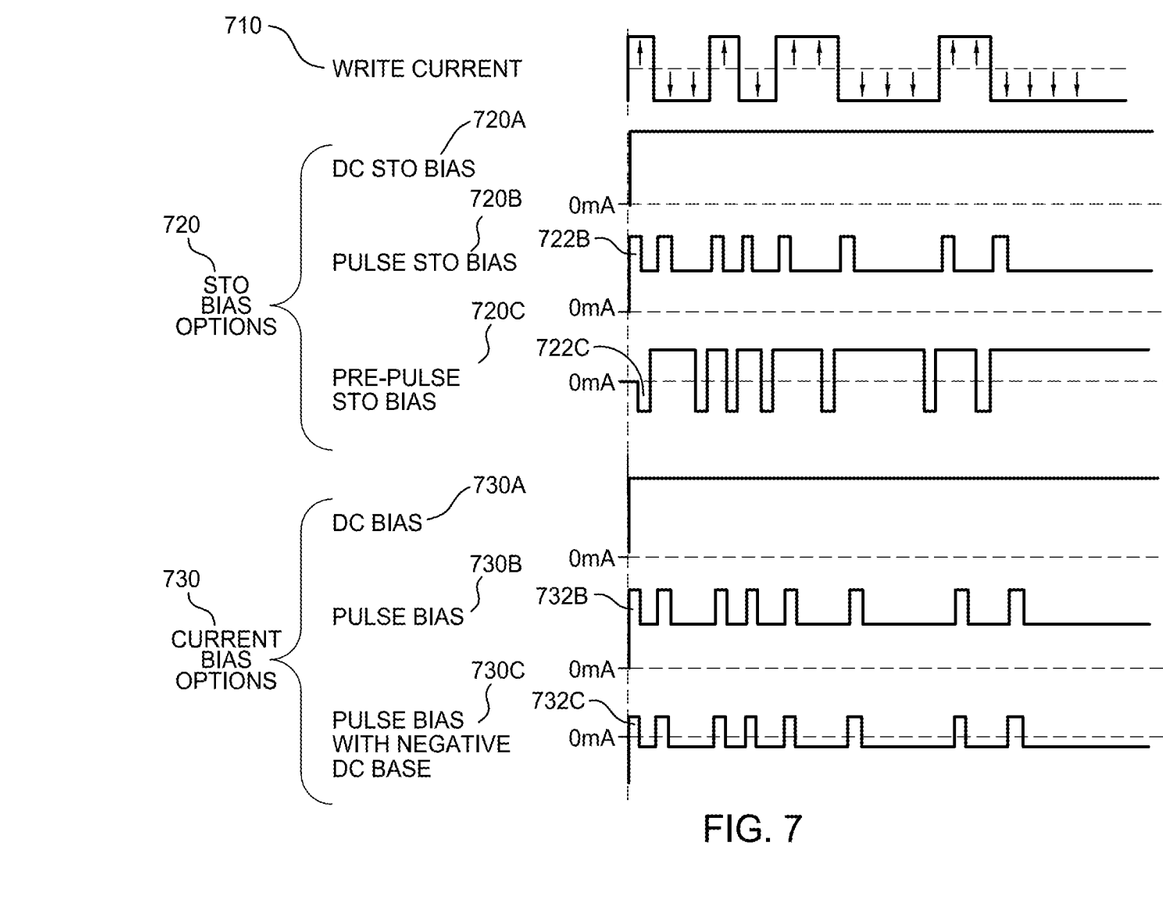
FIG. 7 is a schematic illustration of certain embodiments of waveforms of electric currents supplied to a write coil of a main pole, to a first current path through a trailing gap comprising a STO device, and to the second current path of a write head described in reference to FIGS. 5A-B.

FIG. 7 is a schematic illustration of certain embodiments of waveforms of electric currents supplied to the write coil 218 of the main pole 220, to the first current path 520, 570 through a trailing gap 230 comprising a STO device, and to the second current path 530, 580 of the write head 210 described in reference to FIGS. 5A-B.

The waveform 710 provided to the write coil 218 energizes the main pole 220 to produce a recording magnetic field to align or switch a media bit, such as a perpendicular recorded bit or a longitudinal recorded bit, of the magnetic recording medium in alignment with the recording magnetic field.

In certain embodiments, a waveform 720 is provided to the first current path 520 in which the trailing gap 230 comprises a STO device to provide a STO magnetic field. The waveform 720 may be a constant DC bias waveform 720A which remain on regardless of the change in polarity of the write current waveform 710. The waveform 720 may be a pulse assist waveform 720B. The pulse assist waveform 720B includes pulses 722B to roughly correspond whenever the write current 710 changes polarity. The waveform 720 may be a pre-pulse assist waveform 720C with pulses 722C in the opposite polarity to rough precede the change in polarity of the write current 710.

In certain embodiments, a waveform 730 is provided to the second current path 530 to provide a current assist magnetic field. The waveform 730 may be a constant DC bias waveform 730A which remain on regardless of the change in polarity of the write current waveform 710. The waveform 730 may be a pulse assist waveform 730B. The pulse assist waveform 730B includes pulses 732B to roughly correspond whenever the write current 710 changes polarity. The waveform 730 may be a pulse assist with negative DC base waveform 730C with pulses 732C to roughly precede the change in polarity of the write current 710 and a base level of negative DC bias.

In certain embodiments, a magnetic recording device includes a first terminal coupled to a main pole, a second terminal coupled to a trailing shield, and a third terminal coupled to a leading shield to form a first current path through a trailing gap and a second current path through a leading gap. The three terminals allow independent control of bias current through the first current path and the second current path. In one example, the first current path may be through a trailing gap comprising a non-magnetic conductive material to provide a first current assist magnetic field and the second current path may be through a leading gap comprising a non-magnetic conductive material to provide a second current assist magnetic field. The first current path may be further provided through the leading gap to produce another current assist magnetic field. In another example, the first current path may be through a trailing gap comprising a spin torque oscillator (STO) device to provide a STO magnetic field and the second current path may be through a leading gap comprising a non-magnetic conductive material to provide a current assist magnetic field. The first current path may be further provided through the leading gap to produce another current assist magnetic field. The bias current to the second current path may be provided without causing Joule heating of the STO device and without causing a reduction in the reliability of the STO device.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording device, comprising:
a main pole;
a coil around the main pole;
a trailing shield;
a trailing gap between a first surface of the main pole and the trailing shield, the trailing gap comprising a non-magnetic conductive material;
a leading shield;
a leading gap between the main pole and the leading shield, the leading gap comprising a non-magnetic conductive material disposed between a second surface of the main pole opposite the first surface and the leading shield; and
the main pole coupled to a first terminal, the trailing shield coupled to a second terminal, and the leading shield coupled to a third terminal.

2. The magnetic recording device of claim 1, further comprising a first current path formed between the first terminal and the second terminal through the trailing shield, the trailing gap, and the main pole and a second current path formed between the first terminal and the third terminal through the leading shield, the leading gap, and the main pole.

3. The magnetic recording device of claim 2, further comprising a power source providing a first bias current through the first terminal and the second terminal of the first current path and providing a second bias current through the first terminal and the third terminal of the second current path.

4. The magnetic recording device of claim 3, wherein the first bias current and the second bias current are independently provided.

5. The magnetic recording device of claim 2, wherein the first current path produces a first current assist magnetic field emanating from a media facing surface of the trailing gap and wherein the second current path produces a second current assist magnetic field emanating from a media facing surface of the leading gap.

6. The magnetic recording device of claim 1, further comprising a first current path formed between the second terminal and the third terminal through the trailing shield, the trailing gap, the main pole, the leading gap, and leading shield and a second current path formed between the first terminal and the third terminal through the main pole, the leading gap, and the leading shield.

7. The magnetic recording device of claim 6, wherein the first current path produces a first current assist magnetic field emanating from a media facing surface of the trailing gap and a second current assist magnetic field emanating from a media facing surface of the leading gap and wherein the second current path produces a third current assist magnetic field emanating from the media facing surface of the leading gap.

8. A magnetic recording device, comprising:
a main pole;
a coil around the main pole;
a trailing shield;
a trailing gap between the main pole and the trailing shield, the trailing gap comprising a non-magnetic conductive material;
a leading shield;
a leading gap between the main pole and the leading shield, the leading gap comprising a non-magnetic conductive material;
the main pole coupled to a first terminal, the trailing shield coupled to a second terminal, and the leading shield coupled to a third terminal;
a first current path formed between the second terminal and the third terminal through the trailing shield, the trailing gap, the main pole, the leading gap, and leading shield and a second current path formed between the first terminal and the third terminal through the main pole, the leading gap, and the leading shield; and
a power source providing a first bias current through the second terminal and the third terminal of the first current path and providing a second bias current through the first terminal and the third terminal of the second current path.

9. The magnetic recording device of claim 8, wherein the first bias current and the second bias current are independently provided.

10. A magnetic recording device, comprising:
a main pole;
a coil around the main pole;
a trailing shield;
a spin torque oscillator device between a first surface of the main pole and the trailing shield;
a leading shield;
a leading gap between the main pole and the leading shield, the leading gap comprising a conductive non-magnetic material disposed between a second surface of the main pole opposite the first surface and the leading shield; and
the main pole coupled to a first terminal, the trailing shield coupled to a second terminal, and the leading shield coupled to a third terminal.

11. The magnetic recording device of claim 10, further comprising a first current path formed between the first terminal and the second terminal through the trailing shield, the spin torque oscillator device, and the main pole and a second current path formed between the first terminal and the third terminal through the leading shield, the leading gap, and the main pole.

12. The magnetic recording device of claim 11, further comprising a power source providing a first bias current through the first terminal and the second terminal of the first current path and providing a second bias current through the first terminal and the third terminal of the second current path.

13. The magnetic recording device of claim 12, wherein the first bias current and the second bias current are independently provided.

14. The magnetic recording device of claim 11, wherein the first current path produces a STO magnetic field emanating from a media facing surface of the spin torque oscillator device and wherein the second current path produces a current assist magnetic field emanating from a media facing surface of the leading gap.

15. The magnetic recording device of claim 10, further comprising a first current path formed between the second terminal and the third terminal through the trailing shield, the trailing gap, the main pole, the leading gap, and leading shield and a second current path formed between the first terminal and the third terminal through the main pole, the leading gap, and the leading shield.

16. The magnetic recording device of claim 15, wherein the first current path produces a STO magnetic field emanating from a media facing surface of the spin torque oscillator device and a first current assist magnetic field emanating from a media facing surface of the leading gap and wherein the second current path produces a second current assist magnetic field emanating from the media facing surface of the leading gap.

17. A magnetic recording device, comprising:
a main pole;
a coil around the main pole;
a trailing shield;
a spin torque oscillator device between the main pole and the trailing shield;
a leading shield;
a leading gap between the main pole and the leading shield, the leading gap comprising a conductive non-magnetic material;
the main pole coupled to a first terminal, the trailing shield coupled to a second terminal, and the leading shield coupled to a third terminal;
a first current path formed between the second terminal and the third terminal through the trailing shield, the trailing gap, the main pole, the leading gap, and leading shield and a second current path formed between the first terminal and the third terminal through the main pole, the leading gap, and the leading shield; and
a power source providing a first bias current through the second terminal and the third terminal of the first current path and providing a second bias current through the first terminal and the third terminal of the second current path.

18. The magnetic recording device of claim 17, wherein the first bias current and the second bias current are independently provided.

19. A method of writing data to a magnetic medium, comprising:
   providing a write current to a coil of a main pole;
   providing a first current path through a trailing gap and providing a second current path through a leading gap; and
   providing a first bias current though the first current path and providing a second bias current through the second current path, wherein the first bias current and the second bias current are provided as different waveforms.

20. The method of claim 19, wherein the second bias current is greater than the first bias current.

21. The method of claim 19, wherein the first current path is further provided through the leading gap.

22. The method of claim 21, wherein the trailing gap produces a first current assist magnetic field from the first bias current and the leading gap produces a second current assist magnetic field from the second bias current.

23. The method of claim 21, wherein the leading gap produces another current assist magnetic field from the first bias current.

24. The method of claim 19, wherein the trailing gap comprises a non-magnetic material and wherein the leading gap comprises a non-magnetic conductive material.

25. The method of claim 19, wherein the trailing gap comprises a spin torque oscillator device and wherein the leading gap comprises a non-magnetic conductive material.

26. The method of claim 25, wherein the trailing gap produces a STO magnetic field from the first bias current and the leading gap produces a current assist magnetic field from the second bias current.

27. The method of claim 25, wherein the leading gap produces another current assist magnetic field from the first bias current.

28. The method of claim 25, wherein joule heating of the spin torque oscillator device is reduced.

29. A magnetic recording device, comprising:
   a main pole providing a main writing magnetic field;
   a first assisting writing magnetic field means;
   a second assisting writing magnetic field means; and
   an electric connection means providing a first bias current provided to the first assisting writing magnetic field means and provided to the second assisting writing magnetic field means, and a second bias current provided to the second assisting writing magnetic field means.

30. The magnetic recording device of claim 29, wherein the first assisting writing magnetic field means comprises a first current assist magnetic field and the second assisting writing magnetic field means comprises a second current assist magnetic field.

31. The magnetic recording device of claim 29, wherein the first assisting writing magnetic field means comprises a spin torque oscillator magnetic field and the second assisting writing magnetic field means comprises a current assist magnetic field.

32. The magnetic recording device of claim 29, wherein the different current provided by the electric connection means is a first current waveform provided to the first assisting writing magnetic field means and a second current waveform provided to the second assisting writing magnetic field means.

* * * * *